United States Patent [19]

Solomatin et al.

[11] 4,032,606
[45] June 28, 1977

[54] METHOD FOR PRODUCING SOLID-POROUS RUBBER ARTICLES

[76] Inventors: Anatoly Vasilievich Solomatin, ulitsa Novatorov, 40, korpus 4, kv. 140, Moscow; Anatoly Grigorievich Evseev, smena, NIIRP, 4, kv. 66, Moskovskoi oblasti Zagorsk; Ardalion Nikolaevich Ponomarev, p/o Chernogolovka, ulitsa Tretya, 2, kv. 3; Viktor Semenovich Oskin, p/o Chernogolovka, ulitsa Pervaya, 1, kv. 6, both of Moskovskaya oblast, Noginsky raion; Viktor Lvovich Talroze, Vorobievskoe shosse, 11, kv. 21, Moscow, all of U.S.S.R.

[22] Filed: Sept. 17, 1974

[21] Appl. No.: 506,797

[52] U.S. Cl. .............................. 264/22; 204/159.2; 260/2.5 S; 264/52; 264/54; 264/255; 264/DIG. 14; 264/DIG. 18; 428/315; 428/519

[51] Int. Cl.$^2$ ................. B29D 27/00; C08C 19/00

[58] Field of Search .................. 264/54, 55, 22, 52, 264/255, DIG. 14, DIG. 18; 204/159.2; 260/2.5 S; 428/315, 519

[56] References Cited

UNITED STATES PATENTS

| | | | |
|---|---|---|---|
| 2,296,305 | 9/1942 | Roberts | 264/55 |
| 2,394,122 | 2/1946 | Urmston | 264/55 X |
| 3,562,367 | 2/1971 | Shinohara et al. | 264/54 |
| 3,624,045 | 11/1971 | Stivers | 204/159.2 X |
| 3,791,913 | 2/1974 | Ver Strate et al. | 428/519 X |
| 3,803,274 | 4/1974 | Nakashima et al. | 264/52 X |
| 3,864,143 | 2/1975 | Fantazier et al. | 264/52 X |
| 3,880,970 | 4/1975 | Dinzburg et al. | 264/54 |
| 3,953,620 | 4/1976 | Chandross et al. | 264/22 X |
| 3,959,053 | 5/1976 | Fisk et al. | 264/22 X |

OTHER PUBLICATIONS

Saunders, J. H. and K. C. Frisch, "Polyurethanes Chemistry and Technology," Part II, Technology, New York, Interscience, c1964, pp. 376–383.

*Primary Examiner*—Philip Anderson
*Attorney, Agent, or Firm*—Robert E. Burns; Emmanuel J. Lobato; Bruce L. Adams

[57] ABSTRACT

According to the proposed method for producing solid-porous synthetic rubber articles, a preselected portion of a molded blank of a raw V-like polymeric elastomer compound containing a blowing agent is subjected to ionizing radiation at a temperature below the decomposition temperature of the blowing agent, after which said blank is subjected to heat treatment at a temperature higher than, or equal to the decomposition temperature of the blowing agent.

Despite its simplicity, the disclosed method provides for producing solid-porous rubber-like articles featuring high strength of their solid portion and excellent sealing qualities of their porous portion.

2 Claims, No Drawings

METHOD FOR PRODUCING SOLID-POROUS RUBBER ARTICLES

FIELD OF THE INVENTION

The present invention relates to method for producing solid-porous polymeric elastomer articles.

Such solid-porous polymeric rubber-like articles are extensively used as sealing gaskets in ship-building, aircraft, automobile and refrigerating industries; they are also very good as shoe soles and toys.

BACKGROUND OF THE INVENTION

Solid-porous polymeric elastomer articles combine such valuable properties as limited stiffness and high elasticity, high abrasion resistance, good oxygen ageing, high rupture resistance, and great hardness.

That notwithstanding, extensive application of such articles is limited by the complexity of the present-day methods for producing a solid portion and a porous portion in one article, which involves the use of different polymeric elastomer compounds and different ways of joining these portions together, of which glueing is an example. Another limiting factor is the impossibility of obtaining solid-porous polymeric rubber-like articles of a required configuration.

There is known a method for producing variable-density articles from polyurethane. According to this method, one type of raw polymer elastomeric compound containing a blowing agent is used to produce an article with at least two portions having different densities.

Raw polymer elastomeric compound containing a blowing agent is put into a press mold. One portion of said press mold (Portion 1) is provided with means to limit the foaming of the polyurethane. The other portion of the press mold (Portion 2) has no such means. The raw elastomer compound is heated at temperatures ranging from 43.3° to 204° C. As it is being heated, the raw compound foams, producing an article of a partially polymerized substance, said article having two portions of a different height, but of an equal specific weight. The part of the article that is found in Portion 2 of the press mold is then compressed so that its height becomes equal to that of the part in Portion 1 of the press mold, the compression being maintained over a period of time of up to 10 min., after which the pressure is brought back to normal.

The foregoing method makes it possible to manufacture molded polyurethane articles having two portions with different densities. The borderline between said portions is practically parallel to the direction of the compression.

One of disadvantages inherent in the above method is the fact that the foaming of the molded blank, which takes place at the early stage of the process, only makes it possible to obtain a porous article with variable density. The shape of the portions of this porous article which have different densities is determined by that of Portion 1 of the press mold and the direction of the compression. In addition, the method necessitates the use of telescopic press molds of complicated shapes, which rules out the possibility of carrying out a continuous process.

There is known a number of processes for manufacturing solid-porous articles, for example, a method for manufacturing three-layer shoe soles. The latter method provides for manufacturing three-layer shoe soles whose upper and lower layers are solid, whereas the intermediate layer is porous. Such a sole is made from a molded blank consisting of three layers of a raw polymeric rubber-like compound, the intermediate layer differing from the upper and lower ones by the presence of a blowing agent therein. During the initial stage of the process, the molded blank is partially vulcanized in a press mold at a pressure of 20 to 30 kg/cm$^2$ and a temperature of about 160° C, which temperature is either equal to or higher than the decomposition temperature of the blowing agent. During the second stage of the process, the pressure is (released), the compound containing the blowing agent foams, and the vulcanization of the blank is completed.

The article thus obtained has solid and porous portions.

Apart from inconveniences involved in the preparation of two different polymeric compounds or compositions, the manufacturing of three-layer shoe soles necessitates a number of laborious operations, such as coating the intermediate layer on both sides. The process also calls for expensive press molds and other equipment. In addition, defects often occurs in joining the layers together, which in most cases is due to the formation of air bubbles between layers. Finally, the use of the press molding operation makes it absolutely impossible to carry out a continuous manufacturing process.

THE INVENTION

It is an object of the present invention to provide a process for manufacturing solid-porous polymeric elastomer articles, which would make it possible to obtain articles with a predetermined configuration of solid and porous portions thereof, with said portions having the desired physico-mechanical characteristics and being reliably joined together.

According to the foregoing and other objects of the present invention, the latter essentially resides in that a preselected portion of a molded blank of a raw polymeric elastomer compound containing a blowing agent is subjected to ionizing radiation at a temperature below the decomposition temperature of the blowing agent with subsequent heat treatment of said blank at a temperature higher than, or equal to the decomposition or blowing temperature of the blowing agent.

The action of the ionizing radiation upon the preselected portion of the molded blank at the above-indicated lower temperature brings about vulcanization or cross-linking of that portion. The degree of vulcanization depends upon the radiation dose. The latter dose is distributed over the surface and volume of the blank so as to exclude foaming of the preselected portion subjected to ionizing radiation, in the course of subsequent heat treatment of the blank at a temperature higher than, or equal to the decomposition temperature of the blowing agent. In this manner the solid portion of the blank is produced. In the course of subsequent heat treatment of the entire blank at a temperature higher than, or equal to the decomposition temperature of the blowing agent, the latter agent foams and decomposes in the blank's selected portion that has not been subjected to the ionizing radiation. This is how a porous on cellular structure of the latter portion is obtained. At the same time, completion of the vulcanization of this latter portion of the blank takes place.

Ionizing radiation may be of variable geometry and intensity.

The ionizing radiation may be both continuous and pulsed. In both cases the source of radiation and the blank may either be stationary or moving with respect to each other (the movable element may be either the source of radiation or the blank, or both).

It is also possible to apply a radiation-absorbing screen of the required configuration onto the selected portion of the blank, which is done prior to subjecting the blank to ionizing radiation. After the exposed portion of the blank has received a dose of ionizing radiation, the screen is removed, and the blank is further processed in the above-described manner.

The method disclosed hereinabove makes it possible to manufacture, rubber-like elastomer articles that combine high elasticity and limited stiffness of their porous portion with great hardness, high rupture resistance and good oxygen ageing of their solid portion.

The joining of the solid and porous portions of an article is extremely reliable, as the proposed method does not necessitate the use of two different polymeric elastomer compounds and thus rules out the splitting at the joints of the two portions of an article. The bond strength between the solid and porous portions of an article increases from between 3.7 and 4.1 kgf per one centimeter of width between to 6 and 8 kgf per one centimeter of width and only depends upon the tensile strength of the porous layer.

The proposed method involves simple techniques. With the use of electron accelerators as sources of ionizing radiation, it is possible to set up a continuous production line to manufacture extruded solid-porous articles.

The proposed method makes it possible to obtain articles with the desired shape of their solid and porous portions.

DETAILED DESCRIPTION

The method is effected as follows.

A blank is molded in any known manner from one type of raw rubber-like compound or elastomer composition containing a blowing agent.

A preselected portion of the molded blank is subjected to ionizing radiation at a temperature below the decomposition temperature of the blowing agent with a predetermined volume distribution of the absorbed radiation dose. The required distribution of the absorbed radiation dose is attained by selecting the radiation intensity, by moving the electron beam of the required energy and the blank with respect to each other, and by using radiation-absorbing screens. The radiation may be either continuous or pulsed. Under the action of the ionizing radiation, the blank's portion subjected to the radiation is vulcanized till it becomes solid. Then the blank is heated, for example, in presses, autoclaves, boilers, thermostatic controlled ovens, or in a fluidized bed till it reaches a temperature equal to, or higher then the decomposition temperature of the blowing agent. This decomposition of the blowing agent is accompanied by the formation of a porous or cellular structure in that portion of the blank that has not been subjected to the ionizing radiation or was shielded therefrom. The solid structure is formed by the vulcanization of that portion which received the radiation. The production process for manufacturing extruded solid-porous polymeric elastomer articles comprises the steps of extruding a blank blowing agent from an extruder, vulcanizing a preselected portion of the blank under the cross-linking action of an electron beam, foaming the portion of the blank that has not been subjected to radiation by heating the blank to the desired temperature in a tubular thermostatic controlled ovens or a salt bath.

The simplicty of the process and the possibility of coordinating the rates of extruding a blank, subjecting a selected portion of the blank to ionizing radiation and heating the blank in a thermostatic controlled oven to provide for a high degree of automation in controlling the process.

The above-mentioned and other features and objects of this invention and the manner of attaining them will become more apparent and the invention itself will be best understood from the following concrete examples.

EXAMPLE 1

Use is made of a raw synthetic rubber compound of the following composition, parts by weight:
1. Methylvinylsiloxane polymer rubber—100
2. Dicumyl peroxide—0.7
3. Zinc oxide—5.0
4. Silicon oxide—25.0
5. Chalk—20.0
6. Phenylmethyldimethoxylane—10.0
7. Polymethylsiloxane fluid—10.0
8. Azo-di-isobutyronitrile—7.5

A blank is extruded in an extruder in the form of a gasket which is $b$-shaped in section and is moved by means of a traction mechanism to meet a beam of accelerated electrons. It is only the flat portion of the blank that is exposed to the electron beam having an energy of 1 – 1.2 MeV, the electron beam being focused upon this flat portion. The round portion of the blank is covered and shielded from the beam by an aluminum plate which is 1 mm thick. The radiation is carried out at a temperature of 20° –30° C. The absorbed dose amounts to $6 - 10\cdot10^6$ rad. The thus partially vulcanized blank is directed to a tubular thermostat controlled oven where it is subjected to heat treatment at a temperature of 170° – 200° C during 5 to 10 minutes. Thus there is produced a gasket with a porous round portion and a solid flat portion. The production process is continuous. The physico-mechanical characteristics of the solid and flat portions of the gasket are listed in Table 1.

Table 1

| Physico-mechanical characteristics | Porous portion | Solid portion |
| --- | --- | --- |
| Density, g/cm³ | 0.65 | 1.05 |
| Shore hardness | 30 | 60 |
| Ultimate strength, kgf/cm² | 13.5 | 60 |
| Development of residual deformation at 50% compression during 24 hours at a temperature of 200° C, % | 50 | 27 |

EXAMPLE 2

Use is made of the porous synthetic rubber compound formulation as in Example 1. A blank is molded in the form of a plate having dimensions 200 × 100 × 3 mm. Half of the flat surface of the blank is covered with a led screen which is 50 mm thick. On the side of the screen the blank is exposed to γ-rays, the radiation source being Co⁶⁰. The exposure is maintained at a temperature of 20° to 30° C. The absorbed dose amounts to $6 - 10\cdot10^6$ rad. The screen is then removed, and the blank is placed in a thermostat controlled oven where it is subjected to heat treatment at a temperature of 170 to 200° C during 5 to 10 minutes. The result is a solid-porous polymeric elastomer plate with the dimensions of the porous portion 100 × 100 × 6 mm and those of the solid portion 100 × 100 × 3 mm. The physico-mechanical characteristics of this plate correspond to those listed in Table 1.

EXAMPLE 3

Use is made of the raw synthetic rubber compound as in Example 1. A blank is moulded in the form of a plate having dimensions 120 × 60 × 5 mm. The flat surface of the plate is covered with a duralumin grant which is 2 mm thick. On the side of the grate the blank is exposed to accelerated electrons having an energy of 2 – 3 MeV, the exposure being maintained at a temperature of 20°to 30° C. The absorbed dose amounts to 6 – $10 \cdot 10^6$ rad. The duralumin grate is removed, and the plate is placed in a thermostat controlled oven where it is subjected to heat treatment at a temperature of 170° to 200° C during 5 to 20 minutes. The result is a porous plate with a solid grate structure throughout its volume. The physico-mechanical characteristic of this article are as those listed in Table 1.

EXAMPLE 4

Use is made of a raw polymeric elastomer rubber compound of the following composition, parts by weight:
1. Butadiene-styrene rubber — 600.0
2. Colophene — 120.0
3. Vaseline oil — 90.0
4. Stearic acid — 30.0
5. Zinc oxide — 30.0
6. 2-mercaptobenzothiazole (captax) — 7.2
7. Thetramethylthiuram disulphide (thiuram) — 0.6
8. Lithopone (30% ZnS + 70% $BaSO_4$) — 19.2
9. Iron oxide (red oxide) — 30.0
10. Lamp black — 3.0
11. China clay — 318.0
12. White black — 210.0
13. Paramethylurethanebenzolsulphazide — 10.0
14. Sulphur — 18.0

A blank is molded in the form of a plate of 200 ×100 ×8 mm. Both large surfaces of the blank are exposed to accelerated electrons having an energy of 1 MeV. The exposure is maintained at a temperatutre of 20° to 30° C. The absorbed dose amounts to 40 – 70 mrad. The blank is then placed into a mold which has been warmed to a temperature of 160° to 170° C. The mold is then put into a press and maintained at the above temperature during 15 to 20 minutes. The resultant article is a porous shoe sole rubber plate with solid outer layers on its large surfaces. The thickness of the solid layer is 1 to 1.5 mm. Table 2 lists the physicomechanical characteristics of the latter article in comparison with those of three-layer shoe soles manufactured by using the known techniques. In both cases the shoe sole rubber plates were produced from the same rubber compound.

Table 2

| Article | Physico-mechanical characteristics | | | |
| --- | --- | --- | --- | --- |
| | Density, g/cm$^3$ | Shore hardness | Tensile strength, kgf/cm$^2$ | Layer adhesion, kgf/cm of width |
| Article manufactured by known method | 0.84 | 55–67 | 26–30 | 3.7–4.1 |
| Article manufactured by proposed method | 0.75–0.8 | 50–55 | 27–30 | 6.3–8.5 |

What is claimed is:

1. A process for the production of a composite cellular elastomeric article of unitary structure having preselected solid portions and selected cellular portions which comprises the steps of:
    a. forming into a blank, an elastomeric composition having a chemical blowing agent incorporated therein;
    b. irradiating said blank in said preselected portions from a source of cross-linking ionizing radiation, so that cross-linking is effected thereby in said preselected portions by varying the penetrating capacity, intensity and character of said ionizing radiation to said preselected portions;
    c. heating said entire blank including both said radiated preselected portions and the un-radiated selected portions to temperatures above that which said blowing agent decomposes, to thereby foam said blank, in said selected portions while maintaining said cross-linked irradiated portions in substantially solid or no-cellular form.

2. The process according to claim 1 wherein said heating is continued after foaming step (c) until vulcanization is completed throughout said body.

* * * * *